US012589550B2

(12) United States Patent　　　　(10) Patent No.:　US 12,589,550 B2
Sagr et al.　　　　　　　　　　　　(45) Date of Patent:　　Mar. 31, 2026

(54) PCD EXTRUSION NOZZLE

(71) Applicant: Gühring KG, Albstadt (DE)

(72) Inventors: Andreas Sagr, Albstadt (DE); Zarko Stevanovic, Albstadt (DE); Peter Hartmann, Strassberg (DE); Tobias Fechner, Albstadt (DE)

(73) Assignee: Guehring KG, Albstadt (DE)

( * ) Notice: Subject to any disclaimer, the term of this patent is extended or adjusted under 35 U.S.C. 154(b) by 160 days.

(21) Appl. No.: 17/456,389

(22) Filed: Nov. 24, 2021

(65) Prior Publication Data

US 2022/0088862 A1　　Mar. 24, 2022

Related U.S. Application Data

(63) Continuation of application No. PCT/DE2020/100346, filed on Apr. 28, 2020.

(30) Foreign Application Priority Data

May 24, 2019　(DE) ..................... 10 2019 113 993.7

(51) Int. Cl.
　B29C 64/209　　(2017.01)
　B29C 64/118　　(2017.01)
　B33Y 30/00　　(2015.01)
(52) U.S. Cl.
　CPC ............ B29C 64/209 (2017.08); B33Y 30/00 (2014.12); *B29C 64/118* (2017.08)
(58) Field of Classification Search
　CPC ..... B29C 64/209; B29C 64/118; B05B 15/18; B33Y 30/00
　See application file for complete search history.

(56) References Cited

U.S. PATENT DOCUMENTS

| | | | | |
|---|---|---|---|---|
| 4,426,954 | A | * | 1/1984 | Keller .................... H01B 13/16 |
| | | | | 118/DIG. 18 |
| 5,028,227 | A | * | 7/1991 | Gellert .................. B29C 45/278 |
| | | | | 425/549 |
| 7,134,868 | B2 | | 11/2006 | Babin et al. |
| 7,172,142 | B2 | | 2/2007 | Taylor et al. |

(Continued)

FOREIGN PATENT DOCUMENTS

| | | | | |
|---|---|---|---|---|
| CN | | 205467375 | U | * 8/2016 |
| CN | | 107127969 | A | 9/2017 |

(Continued)

OTHER PUBLICATIONS

3D Solex ("UM2+ Hardcore DIAMOND Nozzle"—3D Solex, https://web.archive.org/web/20180927015623/https://3dsolex.com/product/3dsole x-everlastdiamond-nozzle/, Archived Sep. 27, 2018, Retrieved on Nov. 27, 2023) (Year: 2023).*

(Continued)

*Primary Examiner* — Farah Taufiq

(74) *Attorney, Agent, or Firm* — Brown & Brown IP Law PLLC

(57)　　　　　　　ABSTRACT

The invention relates to an extrusion nozzle (1) for processing 3D printing material, having a nozzle base (2) with a seat (22) for fastening in a 3D printing device and an outlet portion (21), said outlet portion (21) comprising a nozzle insert (3), and the nozzle base (2) consisting of a solid carbide, metal or brass and the nozzle insert (3) including a PCD (polycrystalline diamond) material.

14 Claims, 4 Drawing Sheets

(56)                 References Cited

U.S. PATENT DOCUMENTS

| | | | |
|---|---|---|---|
| 8,512,023 | B2 | 8/2013 | Judd |
| 2005/0194472 | A1 | 9/2005 | Geser et al. |
| 2011/0045124 | A1 | 2/2011 | Zuraw |
| 2014/0366456 | A1* | 12/2014 | Chapman ............ E21B 10/5673 |
| | | | 51/307 |
| 2017/0157828 | A1* | 6/2017 | Mandel ................... B29C 48/21 |
| 2017/0355138 | A1* | 12/2017 | Mark ...................... B29C 64/20 |
| 2019/0022934 | A1 | 1/2019 | Kobe et al. |
| 2019/0091929 | A1 | 3/2019 | Harrison et al. |
| 2020/0269506 | A1* | 8/2020 | Macmullen ........... B29C 64/314 |
| 2022/0072778 | A1* | 3/2022 | MacNeish .............. B33Y 30/00 |

FOREIGN PATENT DOCUMENTS

| | | | | | |
|---|---|---|---|---|---|
| DE | 102007024221 | B4 | * | 6/2011 | ............... B05B 1/00 |
| EP | 3069793 | A1 | * | 9/2016 | ............. B05B 15/18 |
| JP | 2009056779 | A | * | 3/2009 | |
| KR | 2003-0023948 | | | 3/2003 | |
| WO | 2005/065836 | A1 | | 7/2005 | |

OTHER PUBLICATIONS

Tridimake ("3D Printer Improvements"—Tridimake, https://www.tridimake.com/2016/06/3d-printing-nozzles-characteristics.html#:~:text=This%20characteristic%20has%20a%20bigger,on%20what%20is%20going%20on., Posted on Jun. 2, 2016, Retrieved on Dec. 1, 2023 (Year: 2023).*
Funayama (JP2009056779A) Espacenet Machine Translation (Year: 2023).*
Chen (CN205467375U) Espacenet Machine Translation (Year: 2023).*
Fecht (DE102007024221B4) Espacenet Machine Translation (Year: 2023).*
Campana (EP3069793A1) Espacenet Machine Translation (Year: 2023).*
International Search Report and Written Opinion (Application No. PCT/DE2020/100346) dated Jun. 24, 2020 (with English translation).
DPMA Register Print Out dated Dec. 1, 2021.
3D Solex S5-UM3 Hardcore DIAMOND Nozzle (archiviert am Sep. 27, 2018)—https://web.archive.org/web/20180927015623/https://3dsolex.com/product/3dsolex-everlast-diamond-nozzle/.
Williams, "Rubies are a 3D Printer's Best Friend" (veroeffentlicht am Nov. 30, 2017) https://hackaday.com/2017/11/30/rubies-are-a-3d-printers-best-friend/.

* cited by examiner

PCD EXTRUSION NOZZLE

The invention relates to an extrusion nozzle for processing 3D printing material according to the independent claim.

The invention deals with a new tool development in the field of 3D extrusion nozzles. 3D extrusion nozzles are the most important component in the case of a 3D printer because the filament is positioned by means of them and the printing speed and the print quality are largely determined.

The 3D printing material to be printed escapes in molten form through the extrusion nozzle or nozzle, respectively, during the fused deposition modeling (FDM) or fused filament fabrication (FFF), respectively. With the diameter, the extrusion nozzle determines the maximum width per line during the printing as well as the diameter of the used filament.

Extrusion nozzles made of brass are widespread due to the good thermal conductivity and low costs.

A disadvantage of 3D extrusion nozzles made of brass is that the nozzles wear quickly when using filaments, such as PEEK (polyetheretherketone) plastics, which are for the high-temperature range, or when using abrasive additives, such as, e.g., carbon fiber or boron carbide. Due to the generated steady friction, in particular the nozzle opening is ground, and the ground nozzle opening leads to a deterioration of the quality of the print result.

Depending on the used filament, it can be required to use an extrusion nozzle made of a different material. It is known to use steel nozzles made of hardened steel. Extrusion nozzles of this type made of steel can also be provided with gemstone insert, for example made of ruby, in order to increase the durability and to permanently improve the print results.

In addition to the higher price, such extrusion nozzles also have the disadvantage that the temperature conductivity is worse compared to brass. In the case of such nozzles with gemstone insert, the risk of breakage is further increased.

The invention is based on the object of providing an extrusion nozzle for processing 3D printing material, which overcomes the disadvantages in the prior art and which ensures a long service life and good print quality in particular in the case of abrasive filament materials.

The object is solved by means of an extrusion nozzle for processing 3D printing material according to the independent claim. Advantageous designs form the subject matter of the independent claims.

The invention comprises an extrusion nozzle for processing 3D printing material comprising a nozzle body comprising a seat for fastening in a 3D printing device and an outlet portion. The outlet portion comprises a nozzle insert. The nozzle body is made of a solid carbide, metal, or brass. The nozzle insert comprises a PCD (polycrystalline diamond) material. In the case of abrasive filament materials, the PCD material has a long service life with low breaking strength. The PCD material further has a high thermal conductivity.

According to a preferred aspect, the nozzle body and the nozzle insert is formed separately. The separate design of nozzle body and nozzle insert permits the use of different materials for the production of the nozzle body and of the nozzle insert.

Particularly preferably, the nozzle body and the nozzle insert is connected to one another by means of a substance-to-substance bond. The substance-to-substance bond can be established by means of soldering in that the nozzle body and the nozzle insert are held together and a solder is applied to the connection point.

According to a particularly advantageous aspect, the solder material used for the connection of nozzle body and the nozzle insert melts starting at a temperature of 500° and more. A temperature-resistant extrusion nozzle can thus be provided, which can be used, for example, when processing PEEK plastics.

A further preferred aspect provides that the outlet portion comprises a recess on the end side. The recess has a size and shape, which is formed to be complementary to the nozzle insert at least in some sections. The recess designed in this way in the outlet portion permits a simple soldering of nozzle body and nozzle insert.

A preferred technical aspect provides that the nozzle insert is made completely of a PCD (polycrystalline diamond) material. This is a material with a good thermal conductivity, which transports the heat from the outlet portion to the outlet opening of the nozzle insert.

The nozzle insert advantageously has an outer contour, which is lasered from all sides. The lasered outer contour preferably has several conically tapering subareas.

The nozzle insert particularly preferably has an outlet opening with 2, 3, 4, 5, or 8 mm.

Another advantageous aspect provides that the outlet portion is formed to taper at an angle in the range of from 50° to 70°, in particular 60°. This contour effects a sufficient freedom of movement of the extrusion nozzle when applying the printing material.

The nozzle insert advantageously has a front surface with a diameter of 1.5 mm. The front surface is large enough to transport sufficient heat to the tip of the extrusion nozzle, and is so small that fine structures can be printed therewith.

The nozzle insert is preferably polished at least in some sections.

The invention will be additionally described below on the basis of the example illustrated in the drawings, in which.

Figure 1:
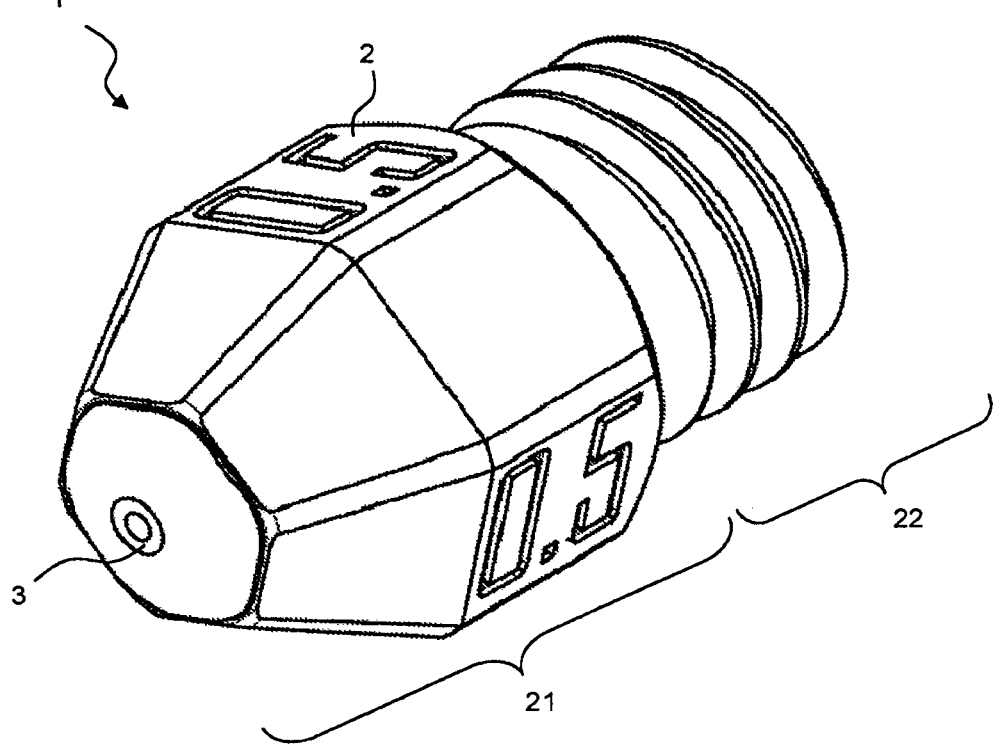
FIG. 1 shows a perspective illustration of an extrusion nozzle for processing 3D printing material according to an exemplary embodiment of the invention.

A perspective view of an extrusion nozzle 1 is shown in FIG. 1, which can be attached to a printing means (not illustrated) for processing 3D printing material.

Figure 2:
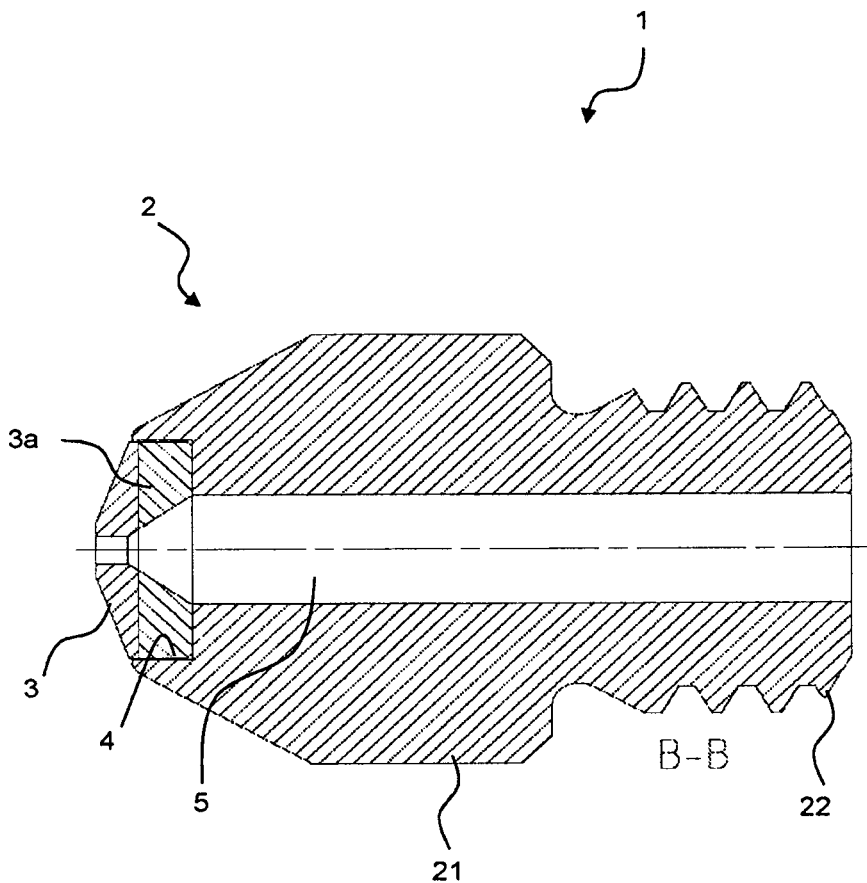
FIG. 2 shows a sectional view of a first alternative of the extrusion nozzle from FIG. 1.

The shown extrusion nozzle 1 serves to process 3D printing material in the form of a filament. The extrusion nozzle 1 has a nozzle body 2, which has a threaded seat 22 in the rear part for screwing into the 3D printer. In the front part, the nozzle body 2 has an outlet portion 21, which is formed in one piece with the seat 22. At the front tip, the outlet portion 21 has a nozzle insert 3, which, as described further below and as illustrated in FIG. 2, continues an inner channel, which runs in the outlet channel and seat.

The nozzle body 2 and the nozzle insert 3 are formed separately. The nozzle body is made of a solid carbide, metal, or brass. The nozzle insert 3 generally comprises a PCD material, wherein the shown nozzle insert 3 is made completely of a PCD material. In the case of abrasive filament materials, the PCD material has a long service life with low breaking strength. The PCD material further has a high thermal conductivity.

The nozzle body 2 and the nozzle insert 3 are connected to one another by means of a substance-to-substance bond in the manner of a soldering point. For use at high temperatures, the solder material used for the connection of nozzle body and nozzle insert is selected in such a way that it melts starting at a temperature of 500° and more. Silver solder is one example.

The opening in the center of the nozzle insert 3 has a diameter of 5 mm, wherein the shown example is not limited to this dimension. The nozzle insert 3 has a front surface with a diameter of 1.5 mm.

In the region between nozzle insert 3 and seat 21, the outlet portion 22 has several surface portions, which are formed to taper at an angle of approximately 60°.

The nozzle insert 3 is polished on the surface, on the inner side, and on the outer side.

FIG. 2 is a sectional view of a first alternative of the extrusion nozzle 1 from FIG. 1. In the shown cross section, the extrusion nozzle 1 has a continuous channel 5, in which the filament is transported during the processing of 3D printing material.

In the right part of the illustration, the extrusion nozzle 1 has a threaded seat 22 for screwing into the 3D printer.

In the left part of the illustration, the nozzle body 2 has an outlet portion 21, which is formed in one piece with the seat 22 made of solid carbide, metal, or brass.

At the front tip, a nozzle insert 3 is received in the outlet portion 21, which coaxially continues the channel 5 for the transport of the filament. In this alternative, a connection piece 3a made of solid carbide is arranged between the nozzle insert 3 and the nozzle body 2. The connection piece 3a includes a funnel-shaped channel portion.

In the case of the illustrated outlet portion 21, a recess 4 is formed on the end side, which has a hexagonal peripheral shape. The recess 4 has a depth and a lateral diameter that the nozzle insert 3, which is formed in a complementary manner, is received almost completely therein with its connection piece 3a. The nozzle insert 3, which is formed in such a complementary manner, has a lasered outer contour from all sides.

Figure 3:
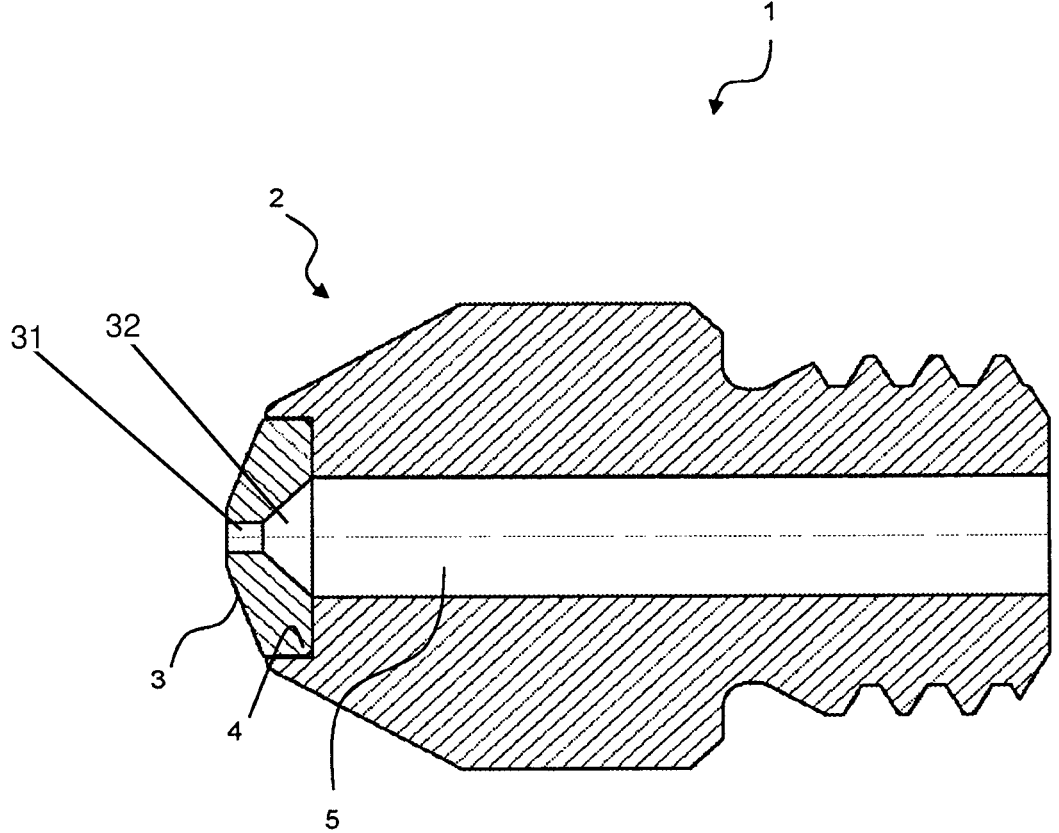
FIG. 3 shows a sectional view of a second alternative of the extrusion nozzle from FIG. 1.

FIG. 3 a sectional view of a second alternative of the extrusion nozzle from FIG. 1, wherein the nozzle insert 3 is formed without connection piece (see FIG. 3a).

At the front tip, a nozzle insert 3 is received in the outlet portion 21, which coaxially continues the channel 5 for the transport of the filament. The nozzle insert 3 includes a cylindrical outlet channel portion 31 having a second cross section diameter, and a funnel-shaped channel portion 32 arranged between the continuous channel and the outlet channel portion. In the shown example, the nozzle insert is made completely of PCD.

In the case of the illustrated outlet portion 21, a recess 4 is formed on the end side, which has a hexagonal peripheral shape. The recess 4 has a depth and a lateral diameter that the nozzle insert 3, which is formed in a complementary manner, is received almost completely therein. The nozzle insert 3, which is formed in such a complementary manner, has a lasered outer contour from all sides.

Figure 4:
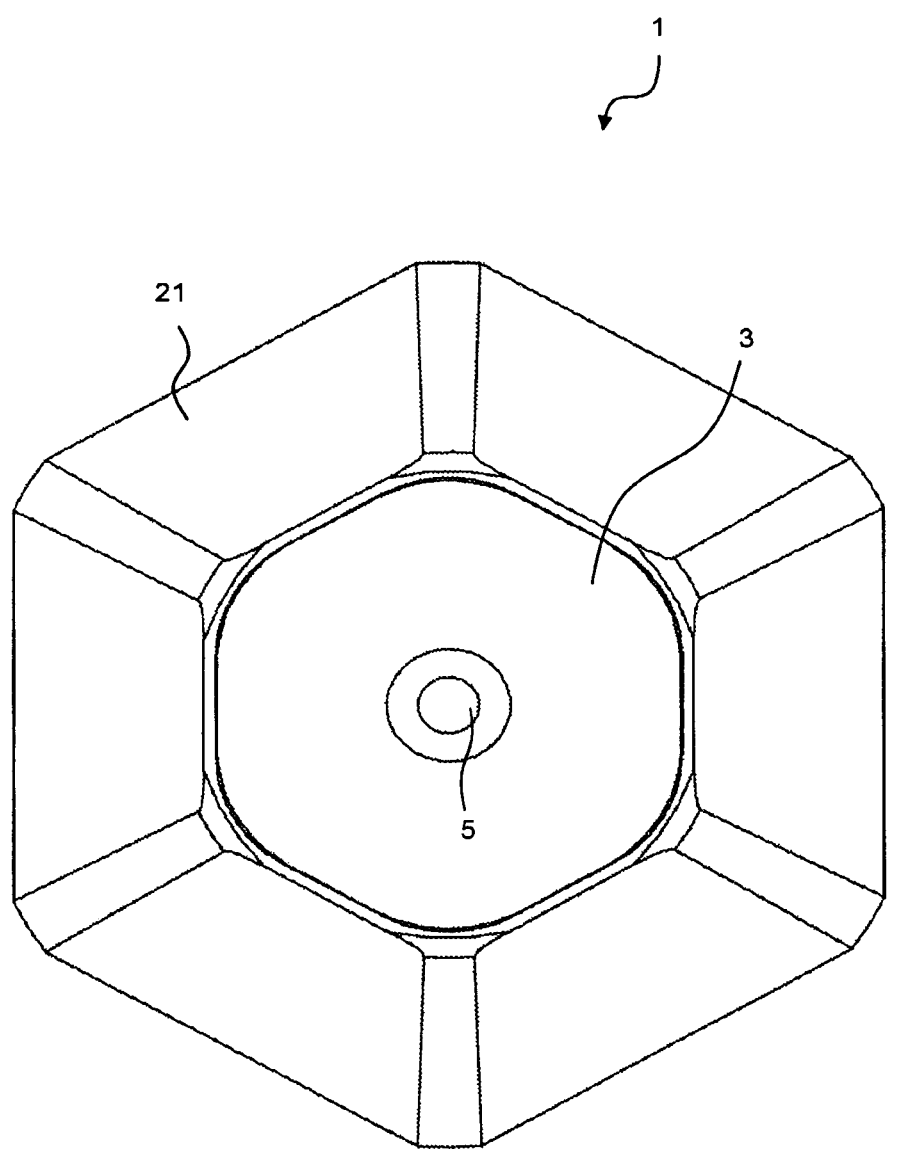
FIG. 4 shows a front view of the extrusion nozzle from FIG. 1.

FIG. 4 is a front view of the extrusion nozzle 1 from FIGS. 1 and 2. The outlet portion 21 supports the nozzle insert 3 in a recess. The channel 5 serves for the transport of the filament.

The invention claimed is:

1. An extrusion nozzle for a 3D printer, comprising:
a first nozzle portion and a second nozzle portion,
the first nozzle portion comprises a first material selected from among solid carbide, metal and brass, and the first nozzle defines a first interior channel region,
the second nozzle portion comprises a second material, the second material comprising polycrystalline diamond material, and the second nozzle portion defines a second interior channel region,
the first channel portion and the second channel portion together define a channel that extends from a rear end of the extrusion nozzle to a front end of the extrusion nozzle along a longitudinal axis of the extrusion nozzle,
the first channel region is cylindrical and has a first diameter, and extends from the rear end of the extrusion nozzle to a front end of the first channel region,
the second channel region extends from a rear end of the second channel region to a front end of the second channel region, the front end of the second channel region is at the front end of the extrusion nozzle,
the second nozzle portion abuts the first nozzle portion such that the front end of the first channel region is adjacent to the rear end of the second channel region,
the second channel region comprises a tapered region, the tapered region extending from the rear end of the second channel region to a front end of the tapered region, the tapered region has the first diameter at the rear end of the second channel region, the tapered region has a second diameter at the front end of the tapered region, the second diameter is smaller than the first diameter, and said tapered region begins where the first material abuts the second material at the front end of the first channel region, and
an entirety of the second nozzle portion is to a front side of the front end of the first channel region.

2. The extrusion nozzle according to claim 1, wherein the first nozzle portion comprises a recess, and at least part of the second nozzle portion is in the recess.

3. The extrusion nozzle according to claim 1, wherein the taper of the tapered region is constant.

4. The extrusion nozzle according to claim 1, wherein the nozzle body and the nozzle insert are separately formed.

5. An FDM-3D-extrusion nozzle for 3D-printing with 3D printing material filaments, wherein the FDM-3D-extrusion nozzle comprises a nozzle body and a nozzle insert, wherein in a rear portion the nozzle body comprises a threaded seat for screwing into a 3D printing device and in a front portion the nozzle body comprises an outlet portion, wherein the outlet portion comprises the nozzle insert at a front tip, wherein the nozzle body is made of a solid carbide, metal, or brass, and the nozzle insert is made completely of a polycrystalline diamond material, wherein
the FDM-3D-extrusion nozzle comprises a continuous channel for transporting the 3D printing material filament,
the continuous channel comprising a cylindrical interior channel portion formed in the nozzle body and an interior channel portion formed in the nozzle insert,
the channel portion formed in the nozzle insert continuing the cylindrical channel portion formed in the nozzle body and opening in an outlet opening of the nozzle insert, and consisting of a tapered portion extending toward the outlet opening and a second portion continuing the tapered portion and opening into the outlet opening, the tapered portion beginning where the channel portion formed in the nozzle insert abuts the cylindrical channel portion formed in the nozzle body.

6. The FDM-3D-extrusion nozzle according to claim 5, wherein the nozzle body and the nozzle insert are formed separately.

7. The FDM-3D-extrusion nozzle according to claim 6, wherein the nozzle body and the nozzle insert are connected to one another by means of a substance-to-substance bond.

8. The FDM-3D-extrusion nozzle according to claim 7, wherein a solder material used for the connection of nozzle body and nozzle insert melts at a temperature of 500 degrees Fahrenheit.

9. The FDM-3D-extrusion nozzle according to claim 5, wherein the outlet portion comprises a recess on the end side, and wherein the recess has a size and shape, which is formed to be complementary to the nozzle insert at least in some sections.

10. The FDM-3D-extrusion nozzle according to claim 5, wherein the nozzle insert has a lasered outer contour from all sides.

11. The FDM-3D-extrusion nozzle according to claim 5, wherein the nozzle insert comprises a front surface with a diameter of 1.5 mm.

12. The FDM-3D-extrusion nozzle according to claim 5, wherein the outlet portion is formed to taper at an angle in the range of from 50° to 70°.

13. The FDM-3D-extrusion nozzle according to claim 5, wherein the nozzle insert is polished at least in some sections.

14. The FDM-3D-extrusion nozzle according to claim 5, wherein the second portion of the channel portion is cylindrical.

* * * * *